(12) United States Patent
Coleman et al.

(10) Patent No.: US 6,678,636 B1
(45) Date of Patent: Jan. 13, 2004

(54) CYCLE TIME ANALYZER

(75) Inventors: Dale Coleman, West Mansfield, OH (US); Hugo Beltran, Dublin, OH (US); Randy L. Shiplett, Plain City, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 434 days.

(21) Appl. No.: 09/764,744

(22) Filed: Jan. 18, 2001

(51) Int. Cl.$^7$ ................................................ B22P 23/06
(52) U.S. Cl. ...................................... 702/182; 702/188
(58) Field of Search ................................ 702/176, 177, 702/182, 187, 188

(56) References Cited

U.S. PATENT DOCUMENTS

| | | | |
|---|---|---|---|
| 4,142,238 A | * | 2/1979 | Brandt et al. ............... 702/176 |
| 4,256,953 A | * | 3/1981 | Allen .......................... 377/16 |
| 4,583,280 A | | 4/1986 | Corrigan et al. .............. 29/563 |
| 4,727,494 A | | 2/1988 | Buote ......................... 364/513 |
| 5,195,041 A | | 3/1993 | George et al. .............. 364/468 |
| 5,255,197 A | | 10/1993 | Iida ............................ 364/468 |
| 5,301,120 A | | 4/1994 | Magario ..................... 364/476 |
| 5,311,759 A | | 5/1994 | Mangrulkar et al. ........... 71/12 |
| 5,423,199 A | | 6/1995 | Mangrulkar ..................... 72/3 |
| 5,586,041 A | | 12/1996 | Mangrulkar ........... 364/474.16 |
| 5,870,698 A | | 2/1999 | Riedel et al. ............... 702/182 |
| 5,880,954 A | | 3/1999 | Thomson et al. ........... 364/184 |
| 5,893,047 A | | 4/1999 | Gimblett et al. .............. 702/33 |
| 5,896,292 A | | 4/1999 | Hosaka et al. ......... 364/468.15 |
| 5,903,459 A | | 5/1999 | Greenwood et al. ........ 364/468 |
| 5,914,879 A | | 6/1999 | Wang et al. ........... 364/468.18 |
| 6,023,667 A | | 2/2000 | Johnson ...................... 702/183 |

FOREIGN PATENT DOCUMENTS

JP        7249071 A    *    9/1995

* cited by examiner

*Primary Examiner*—Marc S. Hoff
*Assistant Examiner*—Craig Steven Miller
(74) *Attorney, Agent, or Firm*—Standley Law Group LLP

(57) ABSTRACT

A cycle time analyzer system and method monitors machine events (analog or digital) and calculates elapsed times for these events. The system and method allow an operator to setup and recall process configurations that define the machine events to be monitored. The process configurations comprise machine event descriptions along with respective programmable logic controller (PLC) addresses that define the start and stop of an event. Each event relates to a step or operation performed by the machine. Standard times or tolerances for performing the steps are specified. Machine cycle times that are outside the standard times or tolerances may be indicative of a malfunction in the manufacturing production environment. Various software modules support process configurations for controlling which machine events are monitored and how they are monitored. The source of a problem may be located by defining additional process configurations to focus on a particular set or series of machine events. The ability to control the monitoring process through the process configurations provides greater flexibility to an operator and increases the usefulness of machine cycle time monitoring.

19 Claims, 15 Drawing Sheets

PROCESS CONFIGURATION     13:43:19     3/3/98

Process: FRONT FLOOR ▽ | Model: S02 ▽ | Zone: A ZONE ▽ | Select PLC: Yaskawa Station 1

New Process

Total Item Time 40.00 sec.

| Cycle Start Condition | Cycle Stop Condition 2 | Cycle Stop Condition 2 |
|---|---|---|
| ○ OFF ● ON | ○ OFF ● ON | ○ OFF ● ON |
| 00097 | 02109 | |

Cycle Abort Condition: [ ]    Delta Deadband 0.00    [Save]    Page 1 of 3  ← →

| Item Description | Std | TIME Accum | Total | Start I/O Add | Start Cond. | Start I/O Cond. | Start Cond. Cont. | Stop I/O Add. | Stop Cond. | Stop I/O Cond. | Stop Cond. Cont. |
|---|---|---|---|---|---|---|---|---|---|---|---|
| SHUTTLE T/F ADV | 3.00 | ☒ | 3.00 | 00097 | ON | | | 10162 | ON | | |
| SHUTTLE LIFT UP | 2.50 | ☒ | 5.50 | 00106 | ON | | | 10172 | ON | | |
| 1ST R/B START/FINISH | 24.00 | ☒ | 29.50 | 10529 | OFF | | | 10529 | ON | | |
| SIDE SHIFT CLAMPED | 1.50 | ☐ | 29.50 | 00467 | ON | | | 00449 | ON | | |
| SHUTTLE LIFT DOWN | 2.00 | ☒ | 31.50 | 00110 | ON | | | 10171 | ON | | |
| SHUTTLE T/F RET | 3.00 | ☐ | 31.50 | 00101 | ON | | | 10161 | ON | | |
| SHUTTLE SWING RET | 3.00 | ☒ | 34.50 | 00564 | ON | | | 10445 | ON | | |
| 2ND R/B START/FINISH | 27.00 | ☐ | 34.50 | 10377 | OFF | | | 10377 | ON | | |
| 3RD ST R/B START/FINISH | 27.00 | ☐ | 34.50 | 11217 | OFF | | | 11217 | ON | | |
| 4TH ST ROBOT START/FINISH | 27.00 | ☐ | 34.50 | 11473 | OFF | | | 11473 | ON | | |
| T/F LIFT UP | 2.50 | ☒ | 37.00 | 00129 | ON | | | 10194 | ON | | |
| T/F RET | 3.00 | ☒ | 40.00 | 00116 | ON | | | 10182 | ON | | |

[Main Menu] [Cycle Times] [Timing Chart] [Print]

PROCESS CONFIGURATION

13:43:19      3/3/98

Process: FRONT FLOOR ▽   Model: S02 ▽   Zone: A ZONE ▽   Select PLC: Yaskawa Station 1

New Process     Save    Total Item Time 40.00 sec.

Cycle Start Condition 2   ○OFF   ⊙ON    Cycle 021

00097

Maintenance

Enter/Select New Process to Create/Modify

[Add] [Delete] [Done]

FLOOR COMP    10171
FRONT COMP    10161
FRONT FLOOR   10445
FRT WH         10377
L SPO MSR AND SEALING   11217
L SPO TT      11473
LT RR INNER    10194
R RR INNER     10182
R SPO MSR AND SEALING
R SPO TT

Page 1 of 3 ← →

— 140

| Item Description | | | | | Stop Cond. | Stop I/O Cond. | Stop Cond. Cont. |
|---|---|---|---|---|---|---|---|
| SHUTTLE T/F ADV | 2.00 | ☒ | 31.50 | 00110 | ON | ON | |
| SHUTTLE LIFT UP | 3.00 | ☐ | 31.50 | 00101 | ON | ON | |
| 1ST R/B START/FINISH | 3.00 | ☒ | 34.50 | 00564 | ON | ON | |
| SIDE SHIFT CLAMPED | 27.00 | ☐ | 34.50 | 10377 | OFF | ON | |
| SHUTTLE LIFT DOWN | 27.00 | ☐ | 34.50 | 11217 | OFF | ON | |
| SHUTTLE T/F RET | 27.00 | ☐ | 34.50 | 11473 | OFF | ON | |
| SHUTTLE SWING RET | 2.50 | ☒ | 37.00 | 00129 | ON | ON | |
| 2ND R/B START/FINISH | 3.00 | ☒ | 40.00 | 00116 | ON | ON | |
| 3RD ST R/B START/FINISH | | ☐ | | | | | |
| 4TH ST ROBOT START/FINISH | | ☐ | | | | | |
| T/F LIFT UP | | | | | | | |
| T/F RET | | | | | | | |

[Main Menu]   [Cycle Times]   [Timing Chart]   [Print]

FIG-6

| 13:43:19 | | PROCESS CONFIGURATION | | | | | | 3/3/98 | |
|---|---|---|---|---|---|---|---|---|---|
| Process: FRONT | Build Item Description | | | | | | | Select PLC | |
| | Select an Item Description from each or any of the list boxes below to describe the equipment component that is to be monitored. | | | | | | | Yaskawa Station 1 | |
| New Process | | | | | | | | Total Item Time 40.00 sec. | |
| Cycle Start Condit | | | | | | | ave | | |
| 00097 OOFF ⊙ON | | | | | | | | Page 1 of 3 ← → | |
| | Item Description 1 ▽ | Item Description 2 ▽ | Item Description 3 ▽ | | | | | | |
| Item Des | 1ST R/B START/FINIS | | | | | top ond. | Stop I/O Cond. | Stop Cond. | Stop Cond. Cont. |
| | 1ST UNLOADER | | | | | | | | |
| | 1ST UP JIG | | | | | | | | |
| | 2ND R/B START/FINIS | | | | | | | | |
| | 2ND UNLOADER | | | | | | | | |
| | 2ND UP JIG | | | | | | | | |
| | 3RD ST R/B START/F | | | | | | | | |
| | 4TH ST ROBOT START | | | | | | | | |
| SHUTTLE T/F ADV | 3.00 | □ | | 31.50 | 00101 | ON | | ON | |
| SHUTTLE LIFT UP | 3.00 | ☒ | Done | 34.50 | 00564 | ON | | ON | |
| 1ST R/B START/F | 27.00 | □ | | 34.50 | 10377 | OFF | | ON | |
| SIDE SHIFT CLAMP | 27.00 | □ | | 34.50 | 11217 | OFF | | ON | |
| SHUTTLE LIFT DOW | 27.00 | □ | | 34.50 | 11473 | OFF | | ON | |
| SHUTTLE T/F RET | 3.00 | □ | | 31.50 | 00101 | ON | | ON | 10161 |
| SHUTTLE SWING RET | 3.00 | ☒ | | 34.50 | 00564 | ON | | ON | 10445 |
| 2ND R/B START/FINISH | 27.00 | □ | | 34.50 | 10377 | ON | | ON | 10377 |
| 3RD ST R/B START/FINISH | 27.00 | □ | | 34.50 | 11217 | ON | | ON | 11217 |
| 4TH ST ROBOT START/FINISH | 27.00 | ☒ | | 34.50 | 11473 | ON | | ON | 11473 |
| T/F LIFT UP | 2.50 | □ | | 37.00 | 00129 | ON | | ON | 10194 |
| T/F RET | 3.00 | □ | | 40.00 | 00116 | ON | | ON | 10182 |
| Main Menu | Cycle Times | | Timing Chart | | | Print | | | |

RECORD PROCESS CYCLE TIME

13:43:19    RECORD PROCESS CYCLE TIME    3/3/98

Process: FRONT FLOOR    Model: S02    Zone: A ZONE

Select Configuration    Target Cycle Time 40.00 sec    Number of Cycles 1

Total Item Time 40.00 sec    Actual Cycle Time

Cycle Information Retrieval

Begin Cycle: O Start    <<   <   >   >>    Cycle Average    Save    Page 1 of 3

| Item | Std Item Time | Actual Time | Delta Time | 10 20 30 40 50 60 | Accumulative Time | | Comments |
|---|---|---|---|---|---|---|---|
| | | | | | Actual | Std/Plan | |
| CLAMP | 3.00 | 6.15 | 9.15 | | 6.15 | 3.00 | |
| SHUTTLE LIFT UP | 2.50 | 9.95 | 12.45 | | 16.10 | 5.50 | |
| 1ST R/B START/FINISH | 24.00 | 21.21 | 2.79 | | 5.12 | 29.50 | |
| SIDE SHIFT CLAMPED | 1.50 | 2.21 | 0.71 | | 5.12 | 29.50 | |
| SHUTTLE LIFT DOWN | 2.00 | 1.95 | 0.05 | | 7.07 | 31.50 | |
| SHUTTLE T/F RET | 3.00 | 2.91 | 0.09 | | 7.07 | 31.50 | |
| SHUTTLE SWING RET | 3.00 | 2.55 | 0.45 | | 9.61 | 34.50 | |
| 2ND R/B START/FINISH | 27.00 | 6.75 | 20.25 | | 9.61 | 34.50 | |
| 3RD ST R/B START/FINISH | 27.00 | 7.67 | 19.33 | | 9.61 | 34.50 | |
| 4TH ST ROBOT START/FINISH | 27.00 | 19.21 | 7.79 | | 9.61 | 34.50 | |
| T/F LIFT UP | 2.50 | 3.25 | 0.75 | | 12.86 | 37.00 | |
| T/F RET | 3.00 | 2.95 | 0.05 | | 15.81 | 40.00 | |

Main Menu    Configuration    Timing Chart    Print

MAIN MENU

13:43:19            3/3/98

F1   Create/Modify Process Configuration

Retrieve Cycle Data

Select the Cycle Data File to Retrieve

```
FLOOR_COMP_S02 2 DOOR CIVIC_2-2-98_9-25-53 AM.csv
FRONT_COMP_S02_02-23-98_12-14-30.csv
FRONT_COMP_S02_02-23-98_12-17-28.csv
FRONT_FLOOR_S02_02-25-98_12-28-22.csv
FRONT_FLOOR_SY8_ACCURA_02-25-98_13-39-28.csv
REAR_FLOOR_COMP_S02 2 DOOR CIVIC_02-25-98_11-35-51.csv
REAR_FLOOR_FRAME_S01_02-23-98_14-45-15.csv
REAR_FLR_PANEL_S02_02-23-98_09-13-07.csv
REAR_FLR_PANEL_S02_02-23-98_09-36-52.csv
ROOF_MSR_S02 SUN ROOF_2-6-98_10-11-03 AM.csv
ROOF_SET_S02 SUN ROOF_2-6-98_11-51-13 AM.csv
SMGW_S02 2 DOOR CIVIC_2-10-98_18-56-55.csv
SMGW_S02 2 DOOR CIVIC_2-4-98_8-03-52 AM.csv
SMGW_S01 4 DOOR CIVIC_2-4-98_8-13-46 AM.csv
SMGW_SY8 ACCURA_2-2-98_3-00-43 PM.csv
SMGW_SY8 ACCURA_2-2-98_3-13-44 PM.csv
```

[ Retrieve ]    [ Delete ]    [ Cancel ]

F10   Shutdown

FIG-11

CYCLE TIME ANALYZER

TECHNICAL FIELD

The present invention relates to measuring of machine cycle times for a manufacturing facility. More particularly, the present invention relates to automatic capturing and measuring of machine cycle times to perform a detailed analysis.

BACKGROUND OF THE INVENTION

Each machine or piece of equipment in a manufacturing environment is responsible for performing one or more steps or operations in the production process. The time required to complete a particular step or series of steps is known as the cycle time. Monitoring of the machine cycle times for machinery in a manufacturing environment is helpful in reducing manufacturing costs and increasing the quality of products that are produced. Monitoring and recording of cycle time data is useful in detecting malfunctions and maladjustments in the manufacturing machinery. Machine cycle times that fall below or exceed specified tolerances or standards are indicators of machine or equipment problems that may result in-product defects. It is possible that certain steps or operations in the manufacturing process are not starting at all or are stalled. Even if the resulting products are not defective, if the machine cycle time is too long, the additional time needed to produce the products is costly.

Systems and methods for monitoring machine cycle times are known. However, in known system and methods, it is difficult to control which steps in the manufacturing process are measured and how they are measured. In many instances, machine cycle times are monitored manually by an operator with a stopwatch. The operator watches for start and stop events and records the elapsed time between the start and stop events. Attempts have been made to automate the monitoring process. U.S. Pat. No. 4,583,280 to Corrigan discloses a system and method for measuring and recording time cycles for each manufacturing step performed at a station. However, operators have very little control over which steps are monitored and how they are monitored. U.S. Pat. Nos. 5,586041 and 5,893,047 relate to monitoring of machine operations, but do not relate directly to monitoring machine cycle times. As with other prior art systems, the disclosed systems do not provide operators with control over which steps in the manufacturing process are monitored and how they are monitored.

SUMMARY OF THE INVENTION

The present invention is a cycle time analyzer system that monitors machine events (analog or digital) and calculates elapsed times for these events. The system and method allow an operator to setup and recall process configurations that define the machine events to be monitored. The process configurations comprise machine event descriptions along with respective programmable logic controller addresses that define the start and stop of an event. Each event relates to a step or operation performed by the machine (e.g., shuttle lift up, shuttle lift down). The operator also defines a standard time or tolerance for performing the step. The operator may further specify whether cycle times for a series of events are to be accumulated. Finally, the operator has the option of saving the collected data to a file that may be recalled for analysis and printing.

The features and functionality of the present invention provide an operator with control over which steps are monitored and how they are monitored. When a problem is detected, an operator has the option of defining additional process configurations based on a subset of the steps monitored previously. As a result, the operator may pinpoint the source of a problem by focusing on a particular set or series of steps. The ability to control the monitoring process through the process configurations provides greater flexibility to the operator and increases the usefulness of machine cycle time monitoring.

BRIEF DESCRIPTION OF THE DRAWINGS

FIG. 3 is a process configuration screen for an example embodiment of the present invention;

FIG. 4 is a select PLC type and station address screen for an example embodiment of the present invention;

FIG. 5 is a new process screen for an example embodiment of the present invention;

FIG. 6 is a popup window of available descriptions for an example embodiment of the present invention;

FIG. 7 is an item description edit window for an example embodiment of the present invention;

FIG. 8 is a record process cycle time screen for an example embodiment of the present invention;

FIG. 9 is a process configuration list popup window for an example embodiment of the present invention;

FIG. 11 is a retrieve process cycle time popup window for an example embodiment of the present invention;

DESCRIPTION OF EXAMPLE EMBODIMENTS

Figure 1:
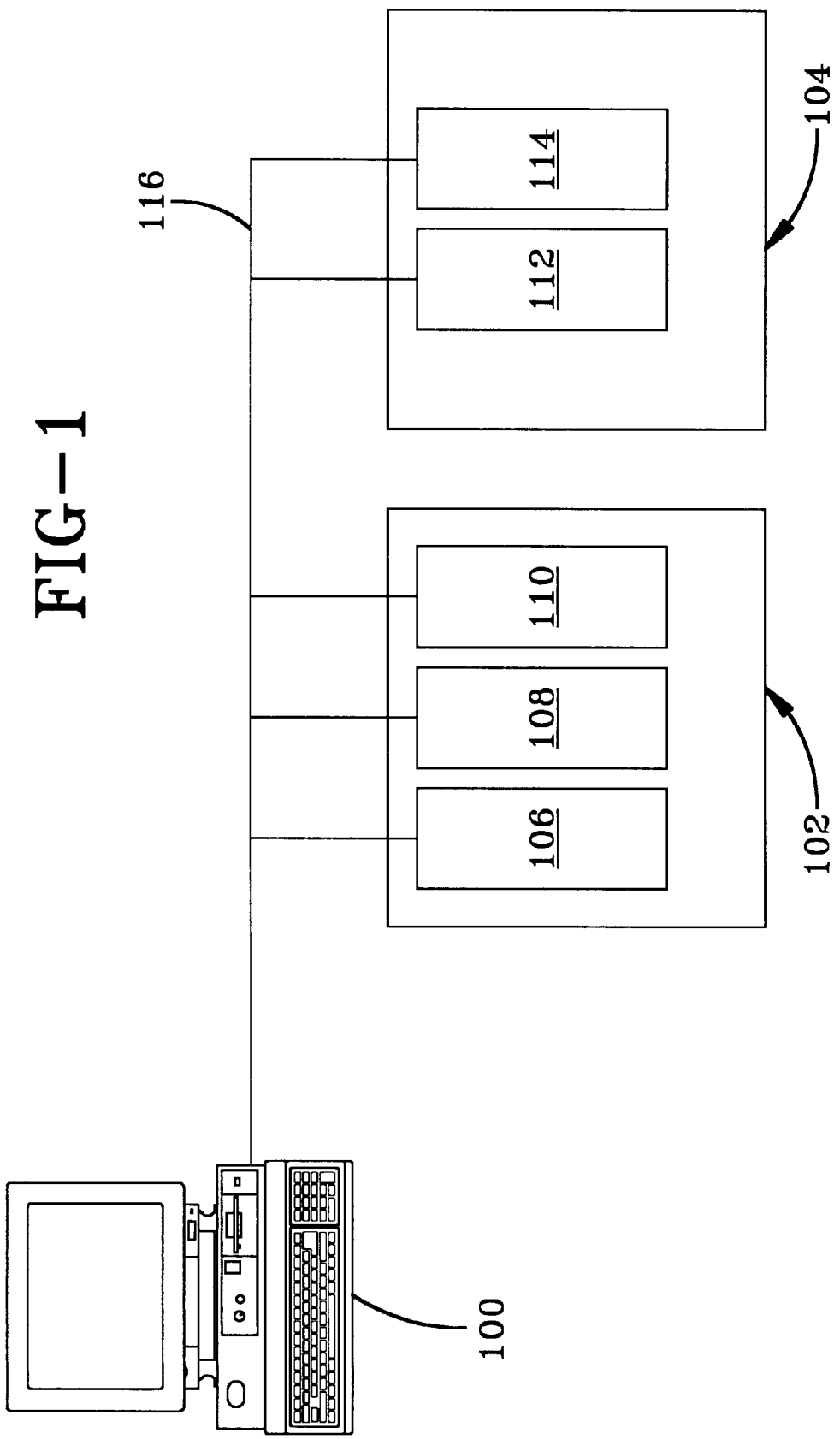
FIG. 1 is a block diagram of the primary components for an example embodiment of the present invention.

Referring to FIG. 1, a block diagram of the primary components of the present invention is shown. One or more machines 102, 104 on a manufacturing production line may each be equipped with one or more programmable logic controllers (PLC). For example, a first machine 102 or piece of equipment may be equipped with three PLCs 106, 108, 110 and a second machine 104 may be equipped with two PLCs 112, 114. Each PLC is designed or programmed to perform a specific step or operation when integrated with a machine. For example, a PLC may be used to control a motor installed in the machine. The PLCs may be supplied by various manufacturers such as Yaskawa, Omron, and Mitsubishi and programmed to perform specific steps or operations. Each PLC 106, 108, 110,112, 114 is adapted for communication with a computer 100 via an RS-232 connection 116. Communication links other than RS-232 connections may be used to establish communication between the computer 100 and the PLCs 106, 108, 110, 112,114 such as IEEE 1394 standard (aka, firewire) or other serial connections based on RS-485, RS-422, or RS-423 standards may be used.

Communication between the computer 100 and PLCs 106, 108, 110, 112, 114 is accomplished in accordance with drivers resident at the computer 100. Various PLC addresses are associated with specific events that occur at a machine. For example, in a welding application, "shuttle lift up" and "shuttle lift down" may be PLC addressable events that occur at a machine. The addressable events are used to create process configurations for obtaining machine cycle time data that is used to monitor the machine or production line status. The computer resident drivers, therefore, support communication in accordance with the various PLC addresses. Because PLC addresses are used to define machine cycles, a machine cycle that relates to events occurring at more than one machine may be defined. Alternatively, a machine cycle that relates to a subset of events occurring at a single machine may be defined. The use of PLC addresses to define machine cycles allows an operator to quickly and easily define "custom" machine cycles for monitoring a production line.

Software modules that support data entry, data collection, data analysis, and reporting as well as other related features and functionality are operational at the computer 100. An operator interacts with the software modules at the computer 100 to define process configurations, start the cycle time recording, and analyze recorded data. The software modules further facilitate communications between the various PLCs 106, 108, 110, 112, 114 and the computer 100 so that accurate cycle time data is recorded and processed. Details of the operator interface are provided herein.

Figure 2:
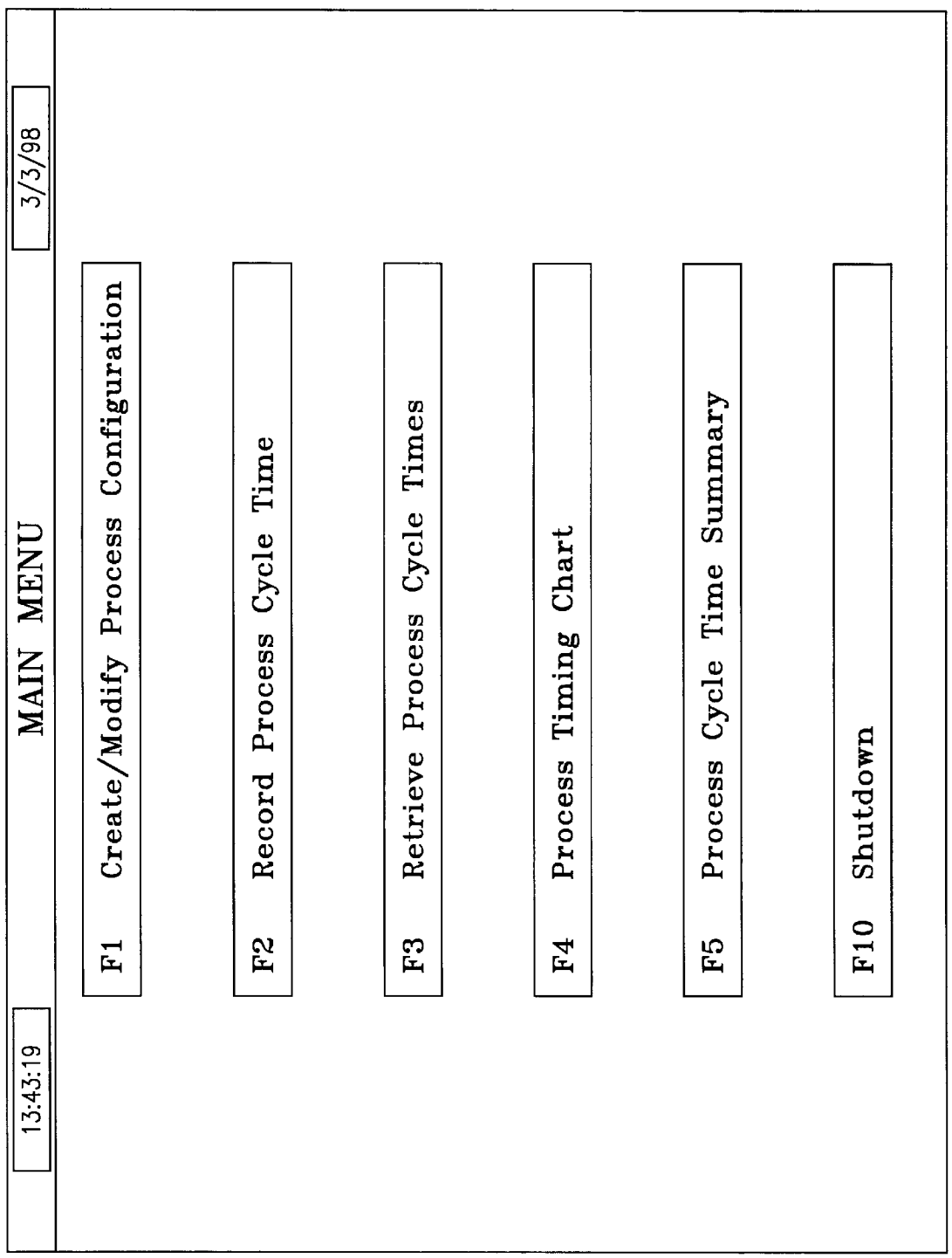
FIG. 2 is a startup screen for an example embodiment of the present invention.

Referring to FIG. 2, a startup screen for an example embodiment of the present invention is shown. The startup screen provides a main menu. The main menu includes all of the options available to the operator and their respective action keys. One or more software modules that execute at the operator's computer provide the features and functionality of the present invention as described in accordance with the various options. These options are as follows:.

F1 Create/Modify Process Configuration
F2 Record Process Cycle Time
F3 Retrieve Process Cycle Times
F4 Process Timing Chart
F5 Process Cycle Time Summary
F10 Shutdown Create/Modify Process Configuration Referring to FIG. 3, a process configuration screen for an example embodiment of the present invention is shown. The process configuration screen allows the operator to create or modify process configurations for machine cycle times to record. A process configuration is a collection of machine event descriptions along with their respective programmable logic controller (PLC) addresses that define the start and stop of the event. Each machine event relates to a step or an operation performed by the machine. For example, in a welding application, "shuttle lift up" and "shuttle lift down" may be machine events.

The top section of the process configuration screen 120 contains information regarding the type of process that is to be recorded. The operator enters the process, model, zone, and PLC type on this screen. Each process relates to a series of events or operations that occur during production of a product. The model relates to the model of the product under production. The zone relates to a zone on the production line where the various production operations occur. Finally, the PLC type relates to the type of PLC used for the process. All of this data may be selected from a series of drop down combination boxes or popup dialog boxes. The button immediately to the left of each of the process, model, and zone drop down combination boxes is used to maintain the information that appears in each drop down box.

Figure 4:
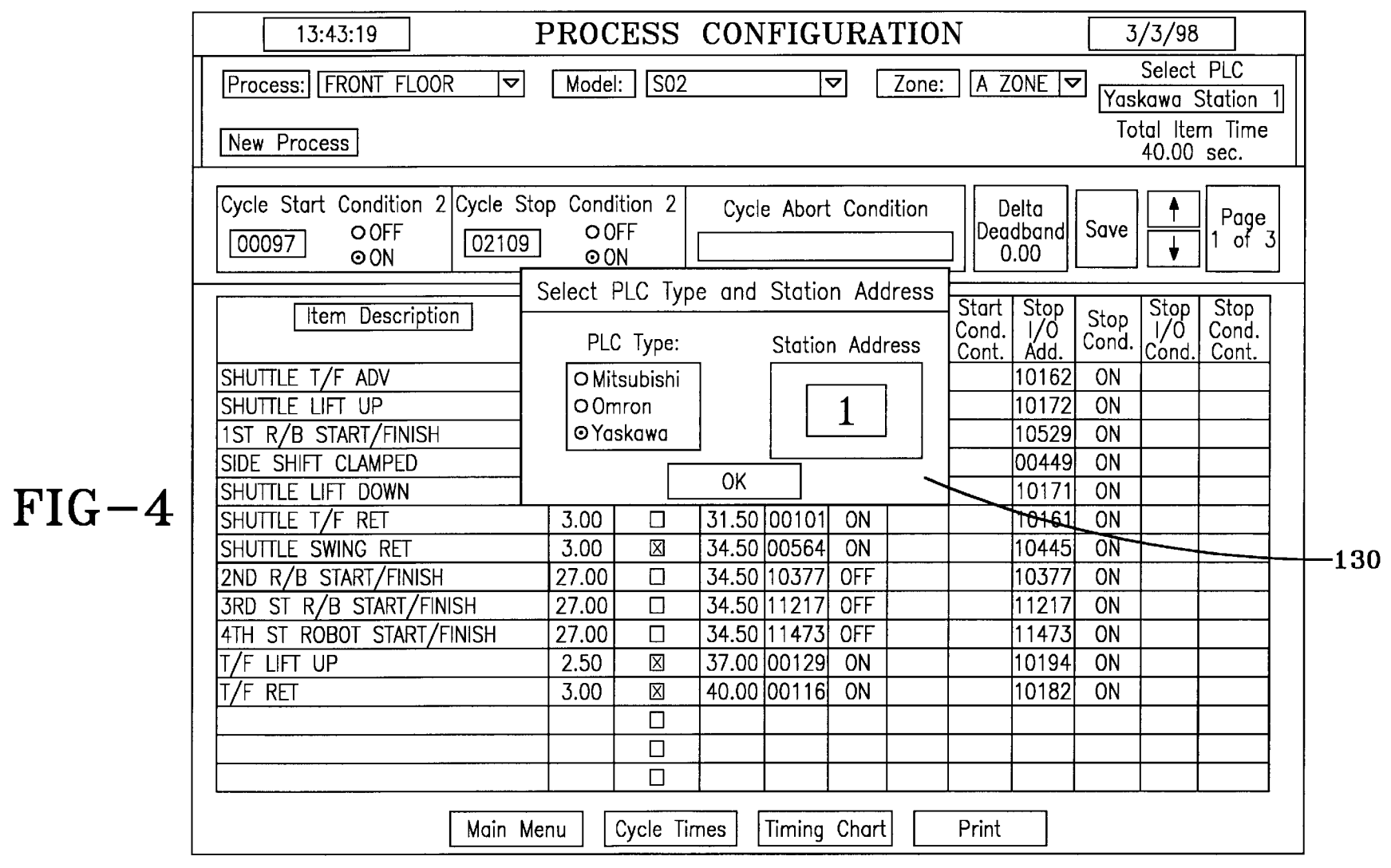

Referring to FIG. 4, a select PLC type and station address screen for an example embodiment of the present invention is shown. A popup window 130 appears allowing the operator to select a PLC type from a list of PLCs and a station address for the selected PLC.

Referring again to FIG. 3, the last option from the top section 120 is the new process button 122. This button is used to clear any data existing on the configuration screen when a new process is to be configured. Referring to FIG. 5, a new process screen for an example embodiment of the present invention is shown. A popup window 140 appears allowing the operator to create a new process or edit an existing process using this screen.

Referring again to FIG. 3, the next section of the process configuration screen 124 allows the operator to enter the cycle start, stop, abort and delta deadband information. Here, the operator enters the starting and ending PLC addresses for the cycle time along with the off/on condition for the cycle start, stop, and abort configurations. The cycle abort portion allows the operator to enter up to four discrete addresses in a logical AND/OR format to stop the recording of cycle data. The delta deadband allows for an acceptable plus or minus tolerance in each item's cycle data that preferably, reflects the color of a bar chart on a record process cycle time screen. To the right of the delta deadband is the "save" button which allows the operator to save the current configuration. A file name is automatically created using the format of PROCESS_MODEL_DATE_TIME. Finally, the up and down arrow buttons provide the ability to page through all three sections of the item configuration data located on the bottom section of the screen.

Figure 7:
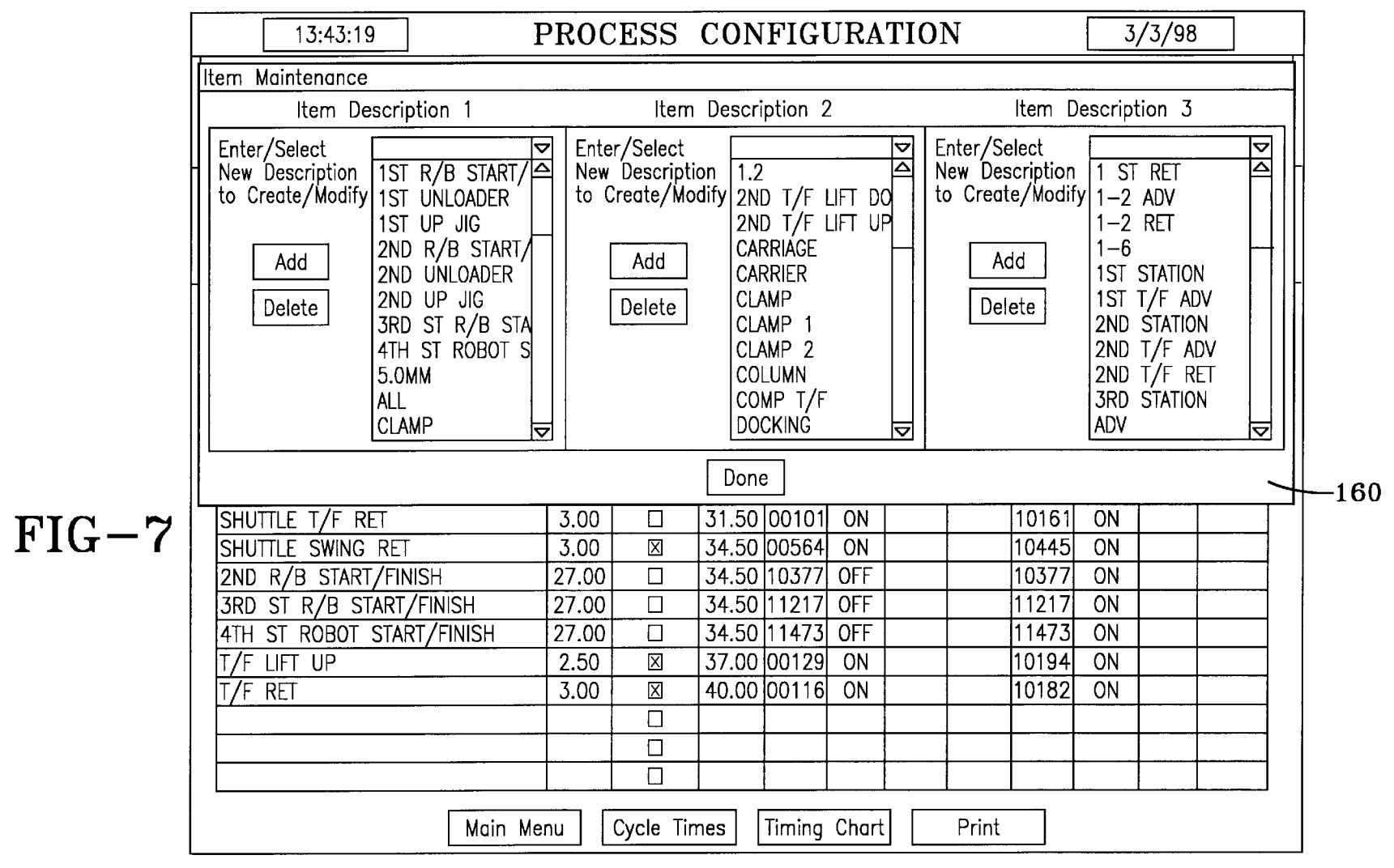

The bottom section of the process configuration screen 126 is a table consisting of up to 45 items that may be configured (15 items per page). In an example embodiment of the present invention, item descriptions for each of three pages are maintained independently as "Item Description 1," "Item Description 2," and "Item Description 3." On the left, the operator clicks on a blank item description to popup the available descriptions from which to choose. Referring to FIG. 6, a popup window of available descriptions 150 for an example embodiment of the present invention is shown. The item descriptions comprise descriptions of a machine or equipment component that is to be monitored. Example descriptions are "unloader," "jig," and "clamp." When a description does not appear in any of the drop down boxes, the item description button 130 appearing in FIG. 3 may be selected. An item maintenance screen as shown in FIG. 7 appears. Referring to FIG. 7, the operator may then edit the descriptions that appear in the drop down boxes.

Referring again to FIG. 3, the standard time column appears to the right of the item description column. In this area, the operator enters the amount of time, in seconds, that a particular event of the process should take to complete. Next, the accumulate column is checked if the operator wants the standard time carried over and added to the total column. If the accumulate check box is not checked, the total from the previous item is used for the current item total. The last eight columns contain the start and stop information for each particular item in the process configuration. Clicking on any column opens a popup window enabling the operator to choose from a discrete, or analog configuration. The operator may then enter the start and stop PLC addresses along with the start and stop conditions of that item. The combination of selected items and values results in an operator-defined process configuration that may be modified as needed. As a result, an operator may control which items are included in a recorded cycle time as well as how they are included.

Record Process Cycle Time

Figure 9:
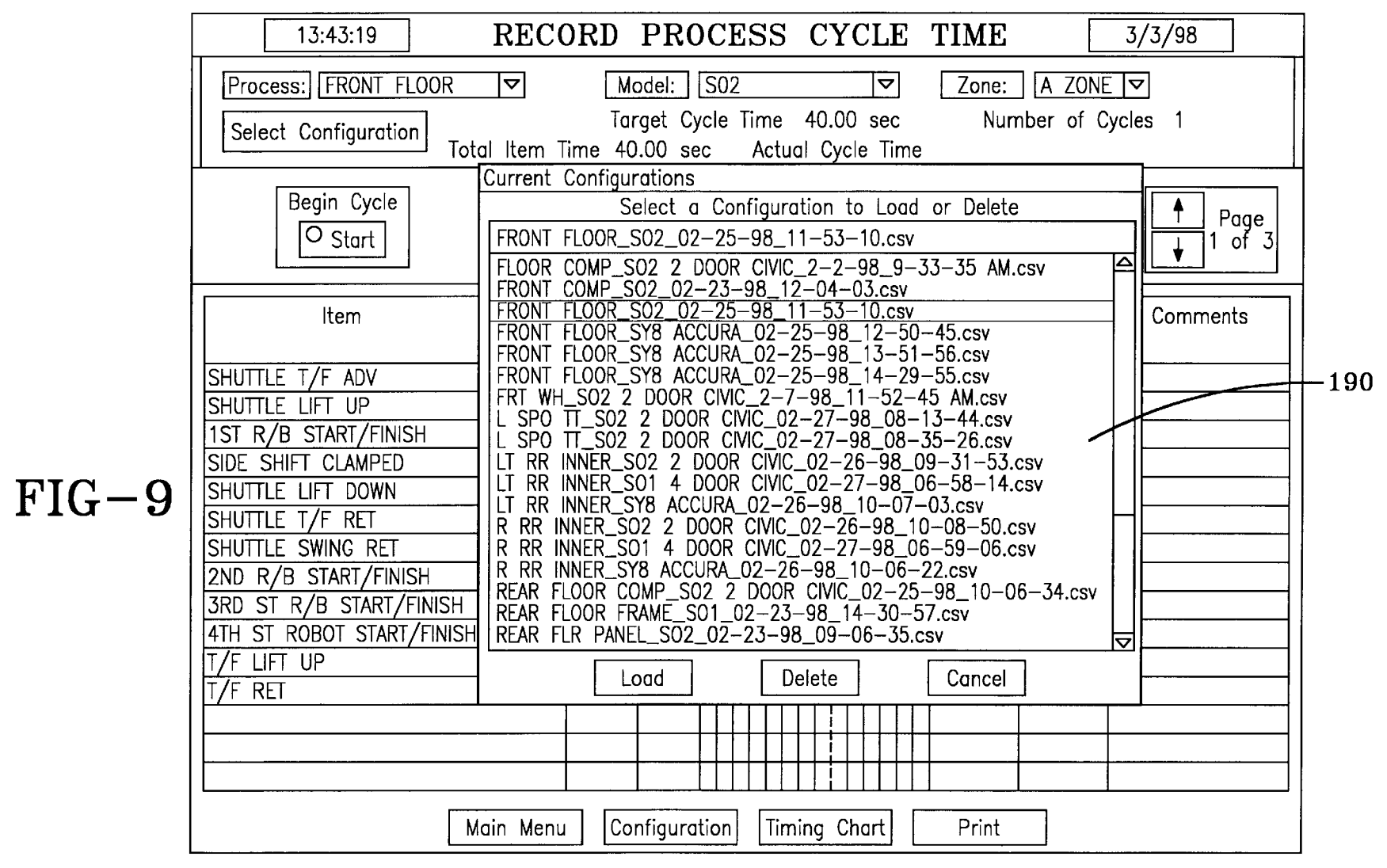

Referring to FIG. 8, a record process cycle time screen for an example embodiment of the present invention is shown. The record process cycle time screen displays the current selected process configuration (without defined PLC I/O addresses) and allows the operator to start monitoring cycle(s) or to examine data from previously monitored cycle(s). If a configuration is not currently loaded, the select configuration button 170 may be selected to choose a process configuration to load from a list of previously saved configurations. Referring to FIG. 9, a popup window 190 with a list of process configurations that may be selected is shown. The items in the list are the names of the files created in accordance with the PROCESS_MODEL_DATE_TIME file name format. Referring again to FIG. 8, displayed at the top of the screen 172 is the process, model, and zone information along with the target cycle time, total item time, and actual cycle time. The number of cycles is an editable field that represents the number of cycles to monitor. A number between 1 and 50 may be entered.

Figure 10:
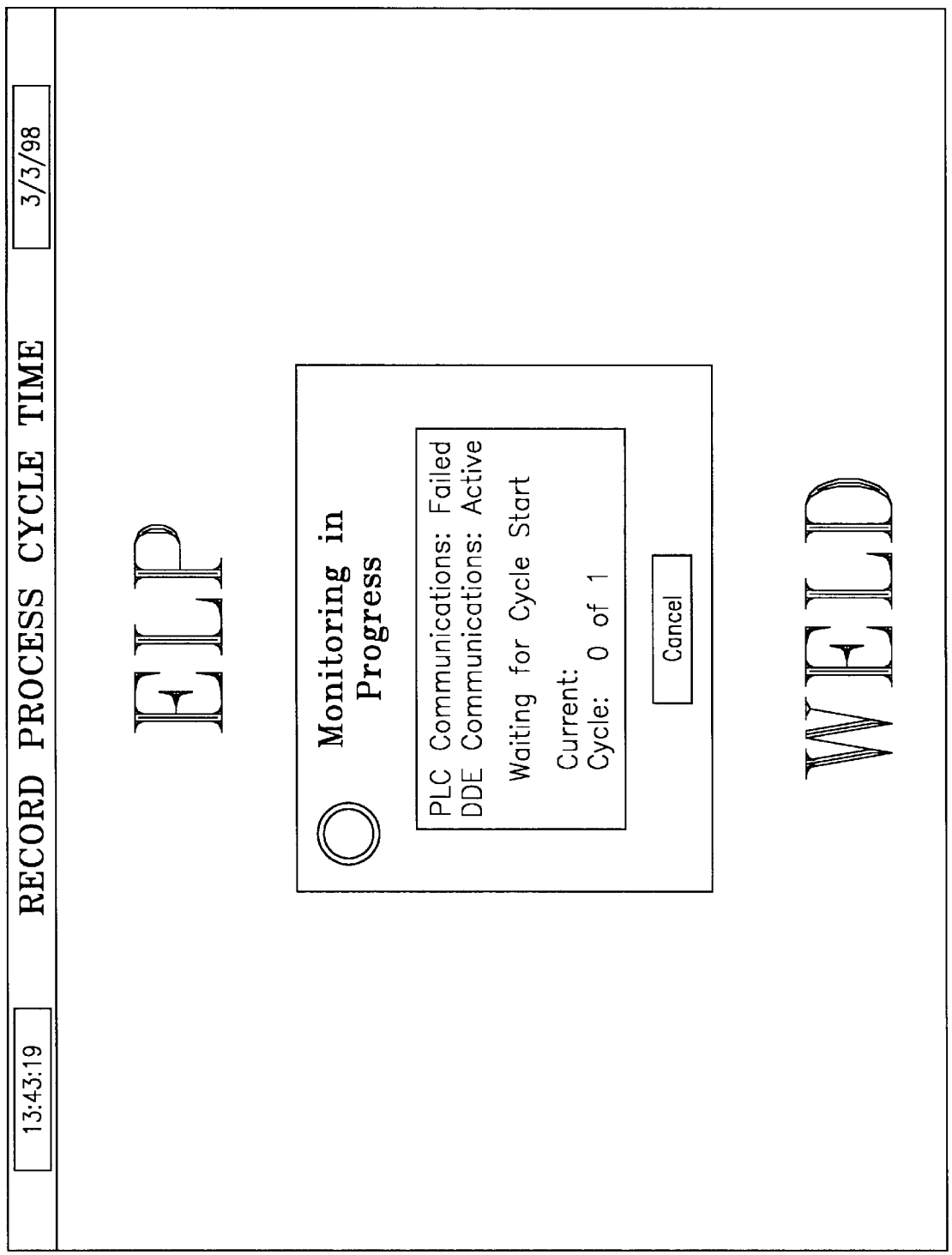
FIG. 10 is a "monitoring in progress" screen for an example embodiment of the present invention.

The next section of the screen 174 is the control section. The operator may start a new recording period or page through previously recorded cycle data. To gather new cycle data, the operator presses the start button 176. Once pressed, a "monitoring in progress" screen as shown in FIG. 10 appears displaying cycle data status along with the communication status of a DDE server and the PLC. In accordance with the communication link between the computer and the PLCs, various PLC events are monitored and data related to the various events is recorded to determine the overall cycle time based on the current process configuration. After the last cycle has been completed, the screen returns to the process cycle time display as shown in FIG. 8 where the data may be analyzed, saved, and printed. If more than one cycle is monitored, the operator may page through each cycle using cycle information retrieval buttons 178. The up and down arrow key buttons may be selected to page through all 45 items (15 items per screen). When complete, the operator may save this information to a file.

The bottom section of the screen 180 contains monitored cycle data. As with the process configuration screen, the item description, standard item time, and accumulative standard/plan time (called total time on the process configuration screen) are displayed here. In addition, there are also columns for the delta time, accumulative actual time, a graphical representation of the elapsed cycle time, and a comment field where the operator may enter a comment or an explanation about a particular item in the process. The delta time displays the discrepancy between the standard and the actual time. The value is negative if the actual time is over the standard time and positive if the actual time is under the standard time. The accumulative actual time is the accumulation of the actual time column based on whether the accumulate check box was checked on the process configuration screen. The bar chart represents the actual time and preferably, is one of three colors: green, yellow, or red. The bar is green if the monitored item is less than the standard time, red if it is greater than the standard time, or yellow if it fell within the range of the deadband.

Retrieve Process Cycle Times

Referring to FIG. 11, a retrieve process cycle time popup window for an example embodiment of the present invention is shown. The retrieve process cycle times popup window displays a list of previously saved data files. The operator may click on an existing file in the list and then load data from the selected file for analysis or printing. Alternatively, the operator may delete the file from the system.

Process Timing Chart

Figure 12:
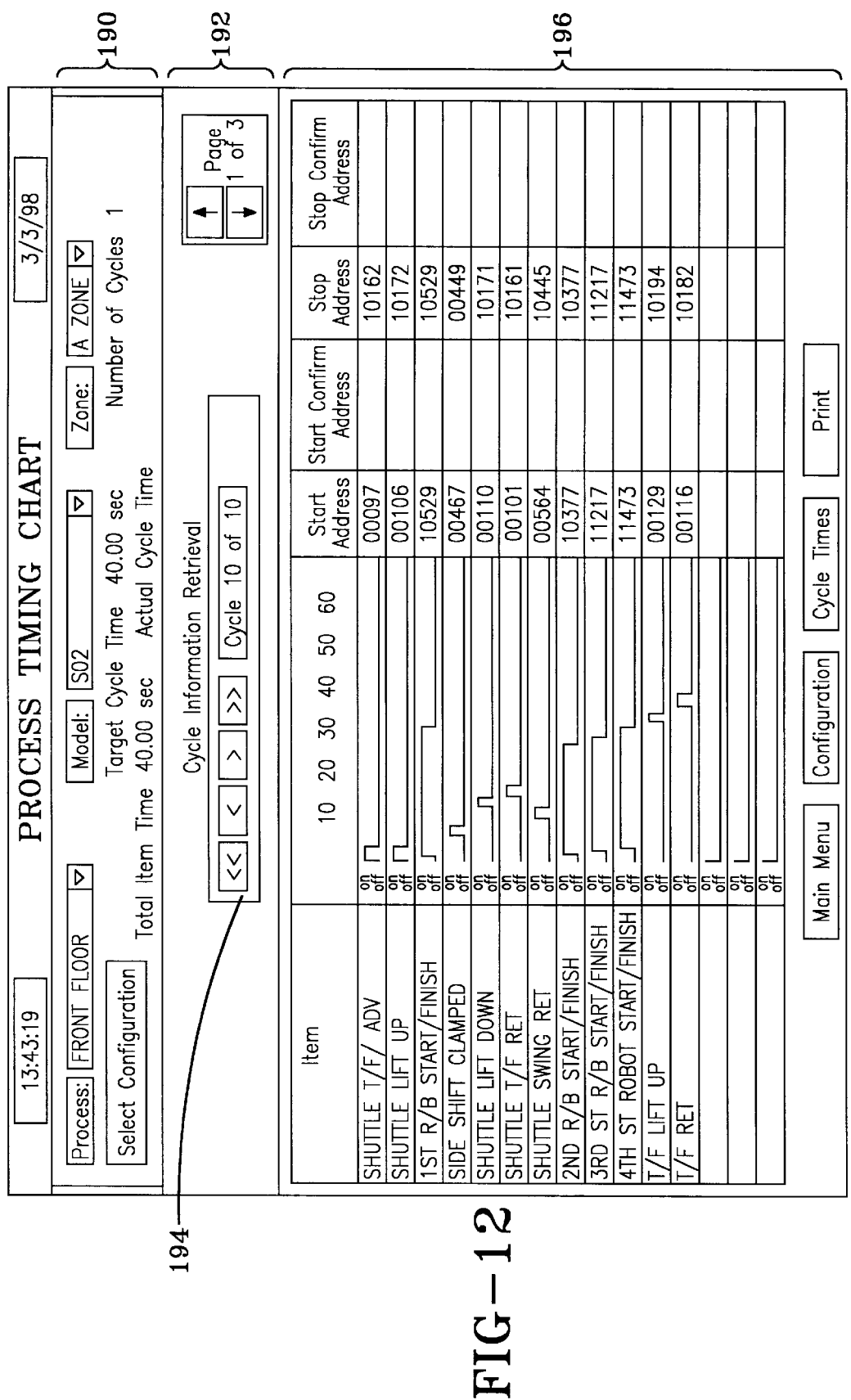
FIG. 12 is a process timing chart screen for an example embodiment of the present invention.

Referring to FIG. 12, a process timing chart screen for an example embodiment of the present invention is shown. The process timing chart screen displays the current process configuration collected data in a timing chart format. Discrete configured items are displayed on this screen. As with the record process cycle times screen, the process, model, and zone information along with the target cycle time, total item time, and actual cycle time is displayed in the top section of the screen.

The next section of the screen is the control section 192. The operator may page through different cycles that were recorded by using the cycle information retrieval buttons 194. Up and down arrow key buttons may be pressed to page through all 45 items (15 items per screen).

The bottom section of the screen 196 displays the timing charts for each discrete item that was configured in the selected process configuration. To the right of each of the timing charts is the item's start address, start confirmation address, stop address, and the stop confirmation address.

Process Cycle Time Summary

Figure 13:
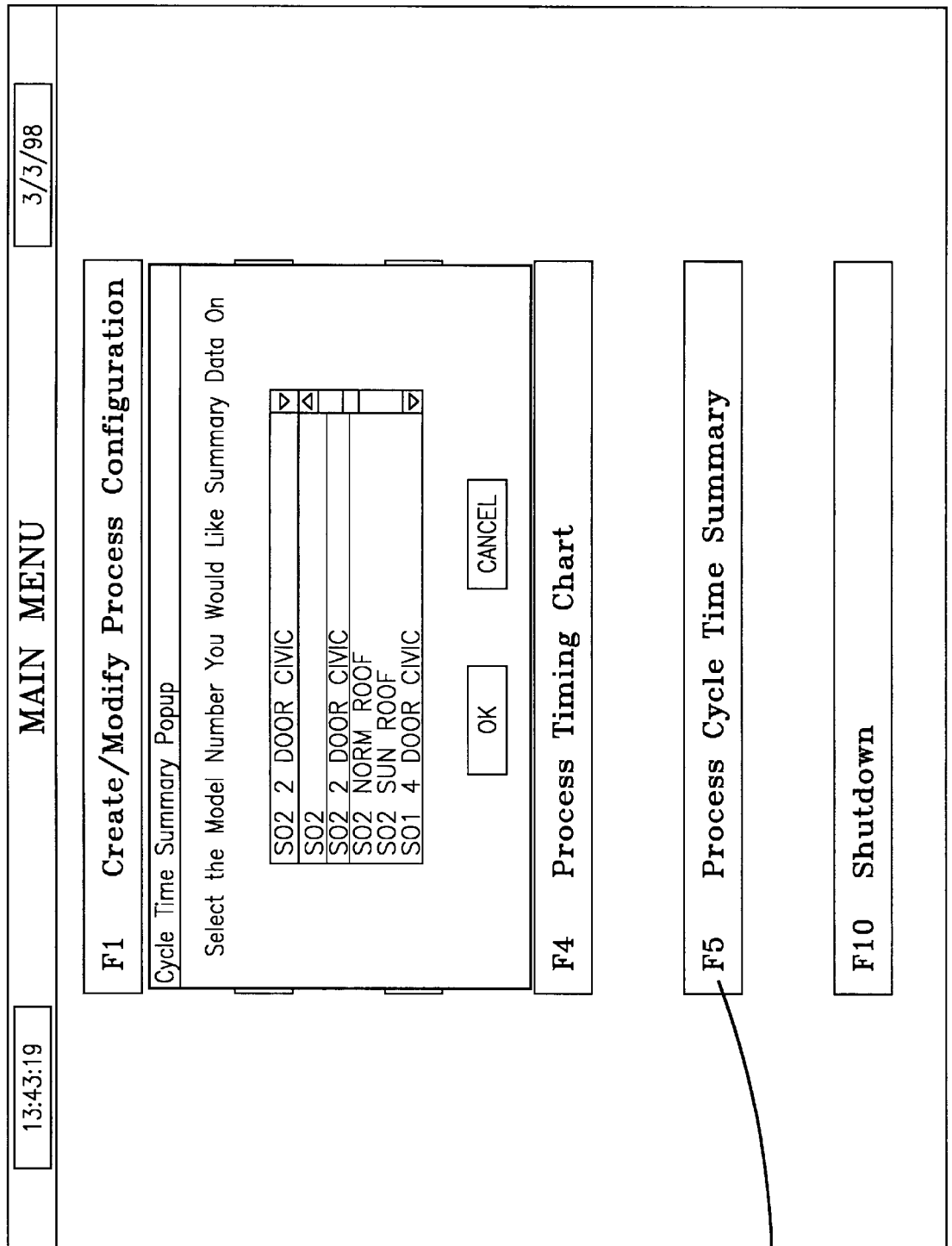
FIG. 13 is a cycle time summary popup window for an example embodiment of the present invention.

Referring to FIG. 13, a cycle time summary popup window in accordance with an example embodiment of the present invention is shown. The process cycle time summary popup window allows the operator to display and analyze a year's worth of data from January to December for a particular model of product. If the process cycle time summary button is selected, the operator is prompted for a model for which summary data is to be provided. If no data is available for the selected model, a message appears and the operator is prompted to select a different model. Next, the operator is prompted to select the data to be used in creating the summary screen. In an example embodiment of the present invention, one saved cycle data file is used per month. The operator may select which file to load if multiple process configurations were saved in the same month. After the last file is selected for the month of December, the system creates a process cycle time summary screen.

Figure 14:
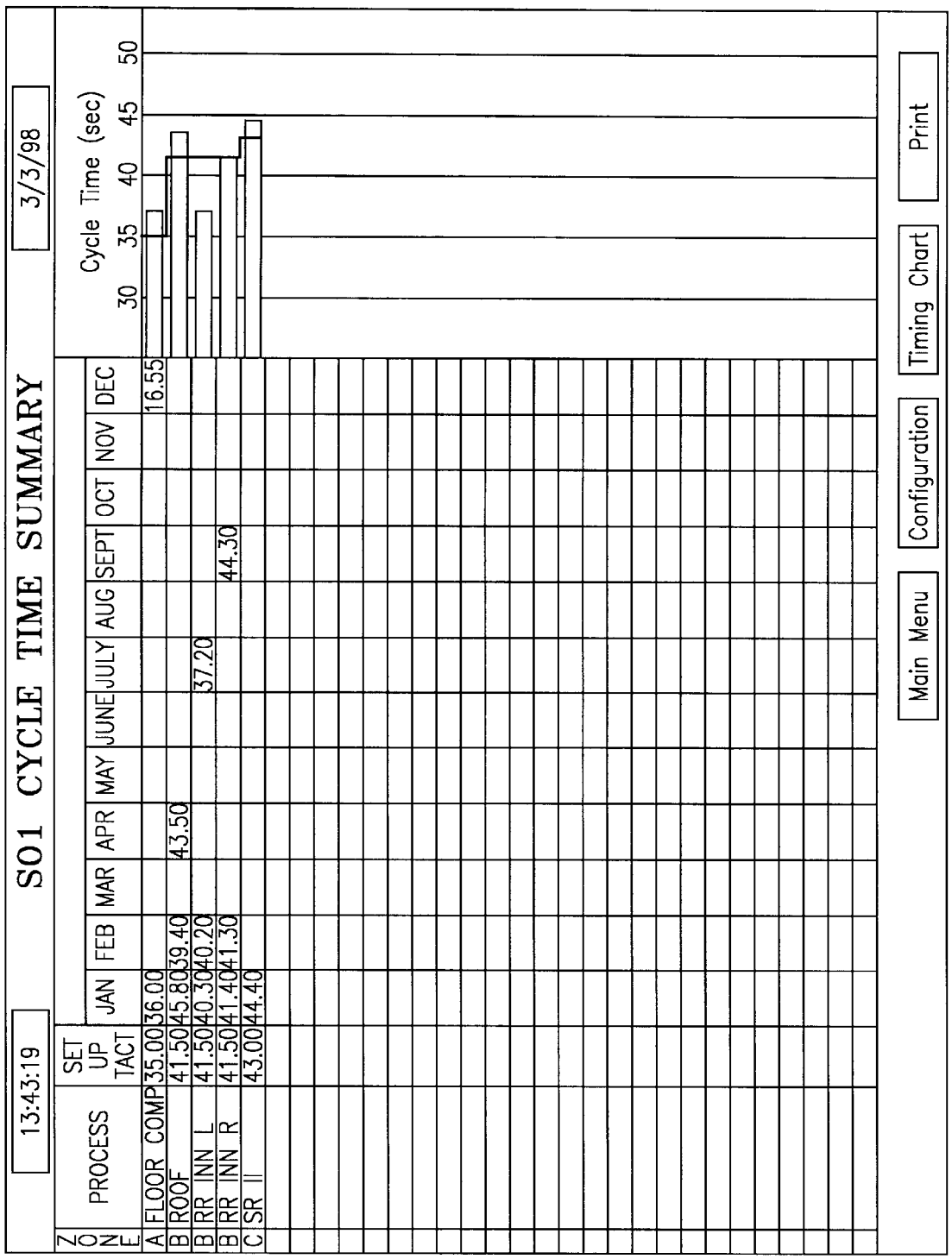
FIG. 14 is a process cycle time summary screen for an example embodiment of the present invention.

Referring to FIG. 14, a process cycle time summary screen for an example embodiment of the present invention is shown. The first three columns on the left display the zone, process, and target time. Next, the actual time for each process is displayed under the appropriate month in which the data was recorded. To the right of this area is a graphical representation of the data in the form of a horizontal bar graph. A vertical line that, preferably, is yellow, indicates the standard or target time that the process usually requires. A horizontal bar graph appears preferably, in red, for the section of time the process took longer than the target time. A horizontal bar graph appears preferably, in green, for the section of time the process took shorter than the target time.

By clicking on an actual month, the operator may view the data for that month on the bar graph. If there is no data for a process that month, the system uses data from the first previous month that it finds.

Shutdown

Referring to FIG. 1, a shutdown button is used to close the cycle time analyzer application. It also closes all DDE servers that may have been open. The operator is asked to confirm the shutdown.

Figure 15:
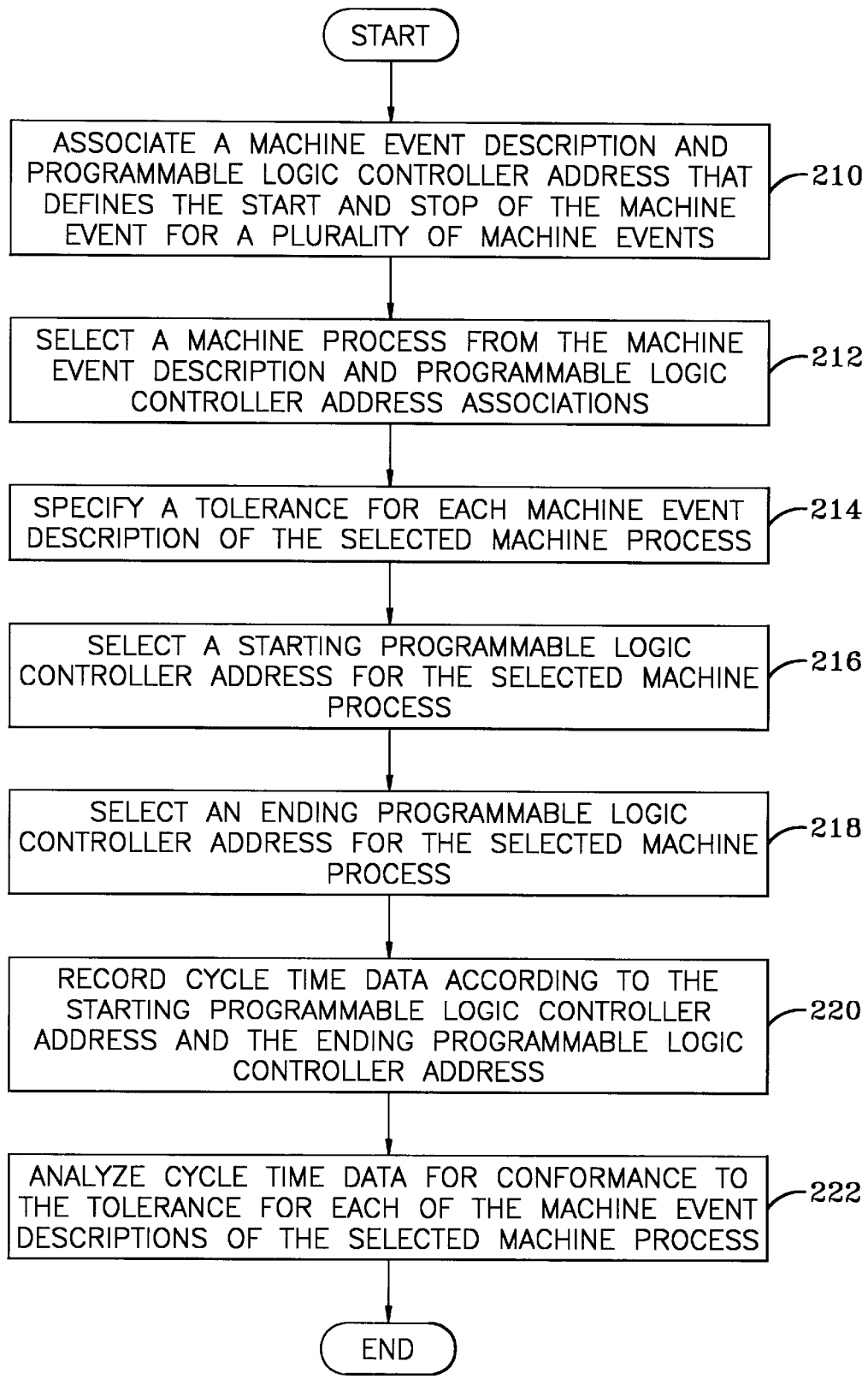
FIG. 15 is a flowchart of the primary steps of the method of the present invention.

Referring to FIG. 15, a flowchart of the primary steps of the method of the present invention is shown. In step 210, a machine event description and a programmable logic controller (PLC) address that defines the start and stop of the machine event are associated for a plurality of machine events. In step 212, a machine process that comprises machine event descriptions and PLC addresses is selected. A tolerance for each machine event description in the selected machine process is specified in step 214. In step 216, a starting PLC address for the selected machine process is selected. In step 218, an ending PLC address for the selected machine process is selected. Next, cycle time data is recorded according the starting and ending PLC addresses selected previously, step 220. Finally, in step 222, the cycle time data is analyzed for conformance to the tolerances for each of the machine event descriptions for the selected machine process. If the machine events for the selected machine process are not completed within the specified tolerances, the cycle time data may be further analyzed to determine the source of the problem and to tune the production process so that the cycle time falls within the specified tolerances.

INDUSTRIAL APPLICABILITY

The present invention is a system and method for monitoring analog and digital machine events and calculating elapsed times for these events to determine a machine cycle time. Machine cycle times that are outside an accepted range may be indicative of a malfunction in the manufacturing production environment.

While particular embodiments of the invention have been illustrated and described, various modifications and combinations can be made without departing from the spirit and scope of the invention, and all such modifications, combinations, and equivalents are intended to be covered and claimed.

What is claimed is:

1. A method for analyzing machine cycle times comprising the steps of:
    (a) defining a process configuration comprising a plurality of machine events related to operations performed by at least one machine;
    (b) specifying values for each of said plurality of machine events, said values comprising a starting programmable logic controller address, a stopping programmable logic controller address, and a standard time;
    (c) recording first cycle time data for each of said plurality of machine events according to said process configuration;
    (d) analyzing said first cycle time data for discrepancies between said first cycle time data and said standard times for each of said plurality of machine events;
    (e) modifying at least one of said values in said process configuration;
    (f) recording second cycle time data for each of said plurality of machine events according to said modified process configuration; and
    (g) analyzing said second cycle time data for discrepancies between said second cycle time data and said standard times for each of said plurality of machine events.

2. The method of claim 1 wherein the step of defining a plurality of machine events comprises the steps of:
    (i) specifying an abort condition for each selected programmable logic controller address; and
    (ii) specifying a deadband for each selected programmable logic controller address.

3. The method of claim 1 further comprising the step of:
    (h) specifying whether cycle time data should be accumulated for each of said plurality of machine events.

4. The method of claim 1 wherein the step of analyzing said first cycle time data and said second cycle time data comprises the step of displaying to an operator a graphical representation of elapsed cycle time.

5. The method of claim 4 wherein the step of displaying to an operator a graphical representation of elapsed cycle time comprises the step of displaying to an operator a bar chart with a visual indication of whether each of said plurality of machine events was completed within said standard times for each of said plurality of machine events.

6. A system for analyzing machine cycle times comprising:
    at least one machine, said machine equipped with a plurality of programmable logic controllers for performing operations at said machine;
    a communication link between said plurality of programmable logic controllers and a computer;
    a process configuration module at said computer for defining and modifying a plurality of process configurations, each of said process configurations comprising machine events related to said plurality of programmable logic controllers and a starting and ending machine event for recording a cycle time related to said machine events;
    a record process cycle time module at said computer for recording cycle time data related to machine events defined in accordance with each of said plurality of process configurations of said process configuration module; and
    a processing timing chart module at said computer for displaying cycle time data recorded in accordance with said record process cycle time module.

7. The system of claim 6 wherein said communication link between said plurality of programmable logic controllers and said computer is selected from the group consisting of a RS-232 link, a RS-485 link, a RS-422 link, a RS-423 link, and a IEEE 1394 link.

8. The system of claim 6 wherein a machine event defined in accordance with said process configuration module comprises a programmable logic controller address for said machine event, a start condition for said programmable logic controller address, and a stop condition for said programmable logic controller address.

9. The system of claim 8 further comprising an abort condition and a deadband value for said programmable logic controller address.

10. The system of claim 8 further comprising a starting programmable logic controller address for a cycle time and an ending programmable logic controller address for said cycle time.

11. The system of claim 10 wherein said record process cycle time module records cycle time data in accordance with said starting programmable logic controller address and said ending programmable logic controller address.

12. The system of claim 6 wherein said processing timing chart module displays on a computer screen a graphical representation of elapsed cycle time related to said machine events.

13. The system of claim 12 wherein said graphical representation comprises a bar chart with a visual indication of whether each of said machine events was completed within a tolerance for each of said machine events.

14. The system of claim 6 further comprising a driver at said computer for each of said plurality of programmable logic controllers.

15. A method for analyzing machine cycle times comprising the steps of:

(a) selecting one machine process from a plurality of machine processes, each of said machine processes comprising a plurality of machine event descriptions and programmable logic controller addresses that define the start and stop of each machine event;

(b) specifying a standard time for each of said plurality of machine event descriptions;

(c) selecting a starting programmable logic controller address in accordance with said selected machine process;

(d) selecting an ending programmable logic controller address in accordance with said selected machine process;

(e) recording cycle time data in accordance with said starting programmable logic controller address and said ending programmable logic controller address;

(f) analyzing said cycle time data for conformance to said standard times for each of said plurality of machine event descriptions according to said starting programmable logic controller address and said ending programmable logic controller address;

(g) modifying said starting programmable logic controller address or said ending programmable logic controller for said selected machine process;

(h) recording cycle time data in accordance with said modified programmable logic controller address; and (i) analyzing said cycle time data for conformance to said standard times for each of said plurality of machine event descriptions according to said modified programmable logic controller address.

16. The method of claim 15 further comprising the step of specifying an abort configuration to control recording of said cycle time data.

17. The method of claim 15 further comprising the step of specifying a delta deadband for each of said plurality of machine event descriptions.

18. The method of claim 15 wherein the step of analyzing said cycle time data comprises the step of displaying to an operator a graphical representation of elapsed cycle time in accordance with said starting programmable logic controller address and said ending programmable logic controller address.

19. The method of claim 18 wherein the step of displaying to an operator a graphical representation of elapsed cycle time comprises the step of displaying to an operator a bar chart with a visual indication of whether each machine event was completed within said tolerance for each of said plurality of machine event descriptions.

* * * * *